United States Patent
Bakshi et al.

(10) Patent No.: US 12,423,695 B2
(45) Date of Patent: Sep. 23, 2025

(54) DISTRIBUTED EVALUATION PLATFORM FOR NONFUNGIBLE TOKENS USING VIRTUAL TOKEN CLONING

(71) Applicant: Bank of America Corporation, Charlotte, NC (US)

(72) Inventors: Sakshi Bakshi, New Delhi (IN); Durga Prasad Kutthumolu, Hyderabad (IN); Shilpi Choudhari, Hyderabad (IN); Ankit Kumar, Gurugram (IN); Saurabh Rajpal, Hyderabad (IN); Hwee Leng Toh, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 17/985,239

(22) Filed: Nov. 11, 2022

(65) Prior Publication Data
US 2024/0161109 A1    May 16, 2024

(51) Int. Cl.
*G06Q 20/40* (2012.01)
*G06N 20/00* (2019.01)

(52) U.S. Cl.
CPC ........... *G06Q 20/401* (2013.01); *G06N 20/00* (2019.01); *G06Q 2220/00* (2013.01)

(58) Field of Classification Search
None
See application file for complete search history.

(56) References Cited

U.S. PATENT DOCUMENTS

| | | |
|---|---|---|
| 6,170,744 B1 | 1/2001 | Lee et al. |
| 10,505,726 B1 | 12/2019 | Andon et al. |
| 11,113,754 B2 | 9/2021 | Andon et al. |
| 11,398,911 B1 | 7/2022 | Gunning |
| 11,494,171 B1 | 11/2022 | Acharya et al. |
| 2006/0130131 A1* | 6/2006 | Pai ............... H04L 63/0823 726/9 |
| 2015/0365398 A1* | 12/2015 | Mattsson ............ G06F 21/60 705/65 |
| 2018/0308002 A1* | 10/2018 | Kurian ............... G06F 11/00 |
| 2021/0133700 A1 | 5/2021 | Williams et al. |
| 2021/0248653 A1 | 8/2021 | McKenzie et al. |

(Continued)

*Primary Examiner* — Jacob C. Coppola
*Assistant Examiner* — Christine Dang
(74) *Attorney, Agent, or Firm* — Banner & Witcoff, Ltd.

(57) ABSTRACT

Aspects of the disclosure relate to a distributed evaluation platform. The distributed evaluation platform may train a machine learning model based on historical nonfungible tokens. The distributed evaluation platform may receive client information from a client device. The distributed evaluation platform may generate NFTs corresponding to the client information. The distributed evaluation platform may generate soft tokens corresponding to each NFT. The distributed evaluation platform may apply test cases to the soft tokens. The distributed evaluation platform may generate remedial tokens based on the soft tokens and remediation actions. The distributed evaluation platform may apply the test cases to the remedial tokens. The distributed evaluation platform may overwrite the NFTs using the remedial tokens. The distributed evaluation platform may send an event processing request to an event processing system. The distributed evaluation platform may refine the machine learning model based on the NFTs.

20 Claims, 16 Drawing Sheets

(56) References Cited

U.S. PATENT DOCUMENTS

| | | |
|---|---|---|
| 2021/0398095 A1 | 12/2021 | Mallett et al. |
| 2022/0138849 A1 | 5/2022 | Henson et al. |
| 2022/0222668 A1 | 7/2022 | Blackburn et al. |
| 2022/0263786 A1 | 8/2022 | Brown et al. |
| 2022/0318907 A1 | 10/2022 | Bleznak et al. |
| 2022/0337439 A1 | 10/2022 | McCoy |
| 2022/0343320 A1 | 10/2022 | Zhang |
| 2022/0343328 A1 | 10/2022 | Fowler et al. |
| 2022/0351165 A1 | 11/2022 | Regenor |
| 2022/0351195 A1 | 11/2022 | Quigley et al. |
| 2022/0355208 A1 | 11/2022 | Stephens et al. |
| 2022/0358186 A1 | 11/2022 | Deuel et al. |
| 2022/0358578 A1 | 11/2022 | Sliwka et al. |
| 2022/0358583 A1 | 11/2022 | Sliwka et al. |
| 2022/0359046 A1 | 11/2022 | Arneault et al. |
| 2023/0043095 A1* | 2/2023 | Milam ................. H04L 9/3247 |

* cited by examiner

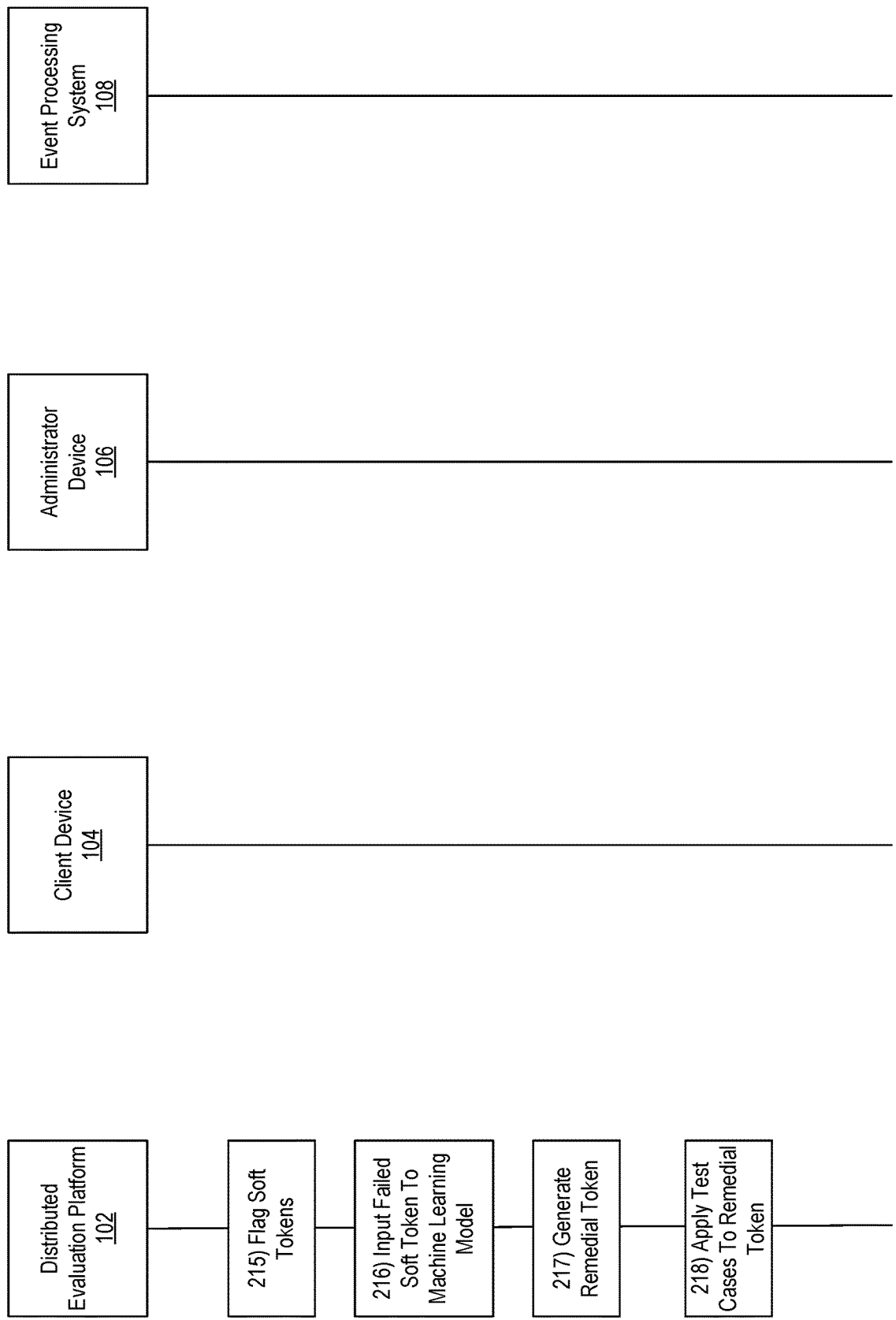

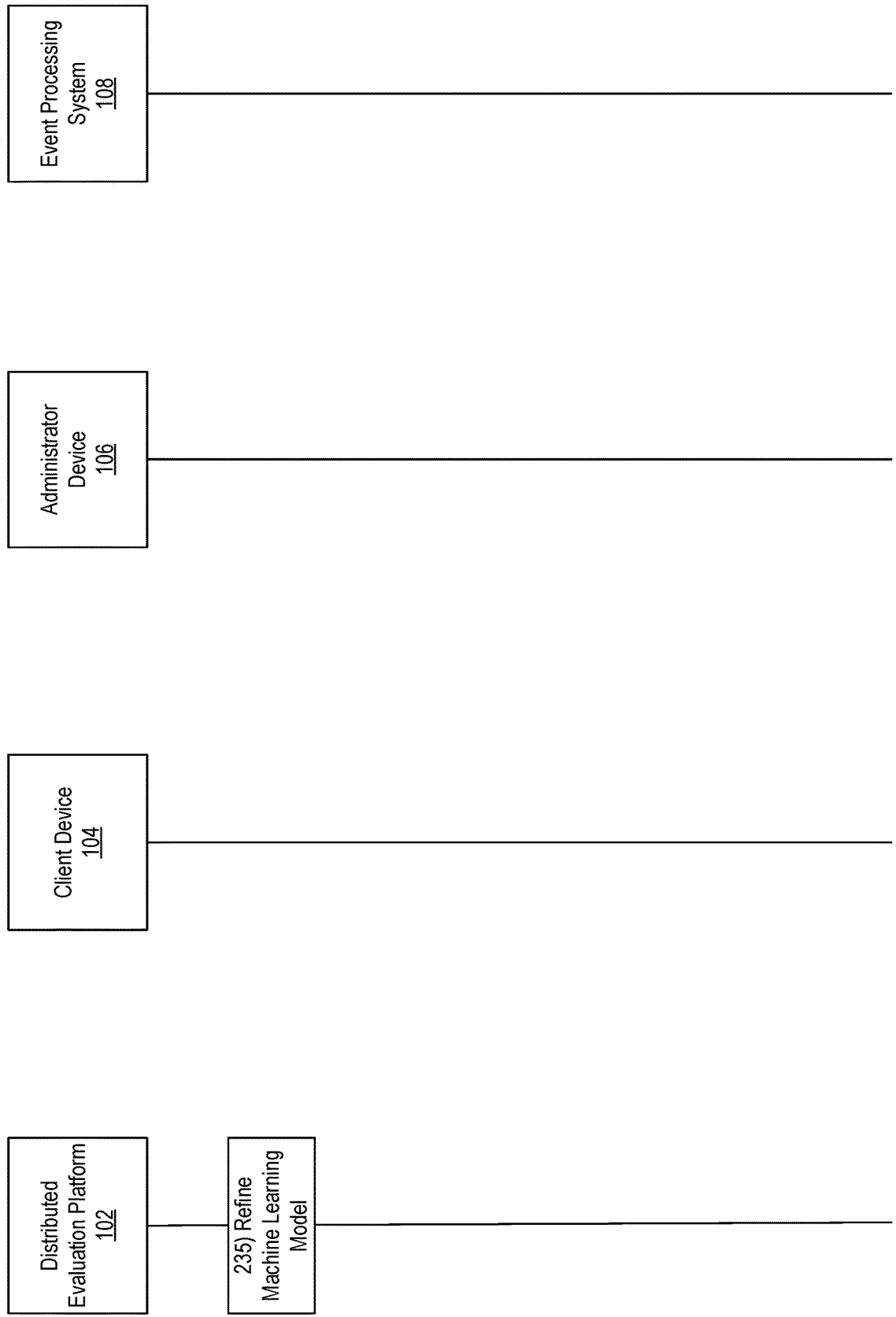

300

Token Validation Confirmation Interface

Welcome, <Client Device Profile>

Requested Event: Transfer Funds to Account XXXX

Token Test Case Failure: Secondary confirmation required for transaction size

Implemented Remediation: Automatically approve transactions between accounts with same owner Event Result: Token Validated, Funds Will Be Transferred to Account XXXX

Potential Unauthorized Activity Notification Interface

Welcome, <Client Device Profile>

Requested Event: Transfer Funds to Account XXXX
POTENTIAL UNAUTHORIZED ACTIVITY DETECTED
Error: Unknown Client Device Result: Transfer Rejected

FIG. 3B

DISTRIBUTED EVALUATION PLATFORM FOR NONFUNGIBLE TOKENS USING VIRTUAL TOKEN CLONING

BACKGROUND

Aspects of the disclosure relate to distributed evaluation for nonfungible tokens using virtual token cloning. In some instances, one individual or multiple individuals may wish to process or otherwise make use of information they have access to in order to complete some task or tasks. In some cases, however, the individual or individuals may have access to a significant amount of information, such as in the form of multiple or bulk files. These files may need to be validated in order to complete the task or tasks. In some instances, validation may require applying one or more test cases to the files. Failure of one or more of these test cases may require retesting of the entire file or multiple files. In some cases, this may negatively impact the user experience by delaying processing of the information and causing inefficient allocation of processing power. Accordingly, it may be important to improve the remediation process of such test case failures.

SUMMARY

Aspects of the disclosure provide effective, efficient, scalable, and convenient technical solutions that address and overcome the technical problems associated with information validation. In accordance with one or more embodiments of the disclosure, a computing platform with at least one processor, a communication interface, and memory storing computer-readable instructions may train a machine learning model based on historical nonfungible tokens (NFTs) and historical test cases to output remediation actions to address identified errors in execution of the test cases on a given NFT. The computing platform may generate an NFT corresponding to client information based on the client information. The computing platform may also generate soft tokens corresponding to the NFT based on test cases for the NFT. The soft tokens each may comprise a copy of the NFT. A unique soft token may be generated for each of the test cases for the NFT. The computing platform may identify that at least one of the soft tokens failed the corresponding test case. The computing platform may input information of the test case failure into the machine learning model to produce a remediation action based on identifying that the at least one soft token failed the corresponding test case. The computing platform may also generate a remedial token based on the at least one soft token and the remediation action. The remedial tokens may comprise copies of the at least one soft token, updated based on the remediation action. The computing platform may identify that the remedial token passed the corresponding test case. The computing platform may overwrite the NFT with the remedial token based on identifying that the remedial token passed the corresponding test case. The computing platform may refine the machine learning model based on the remediation action.

In one or more instances, the computing platform may remove duplicate NFTs from the client information. In one or more examples, the computing platform may, based on identifying that at least one of the soft tokens passed the corresponding test case, flag the at least one passed soft token with a pass flag. The computing platform may send the at least one soft token with a pass flag to a client device.

In one or more instances, the computing platform may send the remedial token to a client device. The computing platform may additionally send one or more commands directing the client device to display information of the remedial token. Sending the one or more commands directing the client device to display information of the remedial token may cause the client device to display the information of the remedial token.

In one or more instances, the computing platform may receive user implementation input from the client device. The user implementation input may comprise one or more commands directing the computing platform to overwrite the NFT based on the user implementation input. The computing platform may also refine the machine learning model based on the user implementation input.

In one or more examples, the computing platform may overwrite the NFT automatically based on the historical NFTs and using the remedial token. In one or more instances, the test cases may comprise one or more of: user information validation, account information validation, payment processing parameters, transaction validation requirements, regional event processing rules, host system rules, or administrator rules.

In one or more examples, the computing platform may generate surrogate keys based on the soft tokens. The surrogate keys may comprise a sequentially generated value. The values may link to the NFT. Additionally or alternatively, the computing platform may store the surrogate keys. In some instances, the surrogate keys may be stored to a distributed ledger or blockchain system. In other examples, the surrogate keys may be stored locally to one or more memory devices.

In one or more instances, the computing platform may overwrite the NFT by deleting the NFT corresponding to one or more specific values, based on the surrogate keys. Additionally or alternatively, the computing platform may overwrite the NFT by replacing the deleted NFT with a new NFT using the remedial tokens corresponding to one or more specific values, based on the surrogate keys. In one or more examples, the computing platform may send an event processing request and the NFT to an event processing system to process an event.

In one or more instances, the NFT may comprise one or more of: user profile information, account information, or biometric information. In one or more examples, the computing platform may generate, based on a second soft token different from the at least one soft token and a second remediation action different from the remediation action, a second remedial token. The second remedial token may comprise a copy of the second soft token, updated based on the second remediation action. The computing platform may identify that the second remedial token failed the corresponding test case. The computing platform may also input information of the test case failure into the machine learning model to produce a corresponding new remediation action.

In one or more instances, the computing platform may use the machine learning model to identify whether the remediation action has historically been implemented, based on the historical nonfungible tokens. The computing platform may also determine whether or not to request user acceptance of the remediation action based on identifying whether the remediation action has historically been implemented.

In one or more examples, the computing platform may be configured to identify whether or not the client information comprises potentially unauthorized information, based on the remediation action. The computing platform may send, based on identifying that the client information comprises potentially unauthorized information, a potential unauthorized activity alert to a client device.

In one or more instances, the remedial tokens may comprise one or more of: user preferences, market information, market scenarios, user suggestions, or administrator preferences. In one or more examples, the remediation actions may comprise one or more of: modifying information, replacing information, or providing new information. In one or more instances, the client information may comprise one or more of: payment files, transaction files, regional validation laws, administrator validation laws, or bulk files. In one or more examples, the historical nonfungible tokens may correspond to a second client device different from a client device corresponding to the NFT.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for evaluating NFTs through virtual token cloning and using a machine learning model in accordance with one or more example embodiments;

FIGS. 3A-3D depict illustrative graphical user interfaces depicting evaluating NFTs through virtual token cloning and using a machine learning model in accordance with one or more example embodiments.

DETAILED DESCRIPTION

Figure 1A:
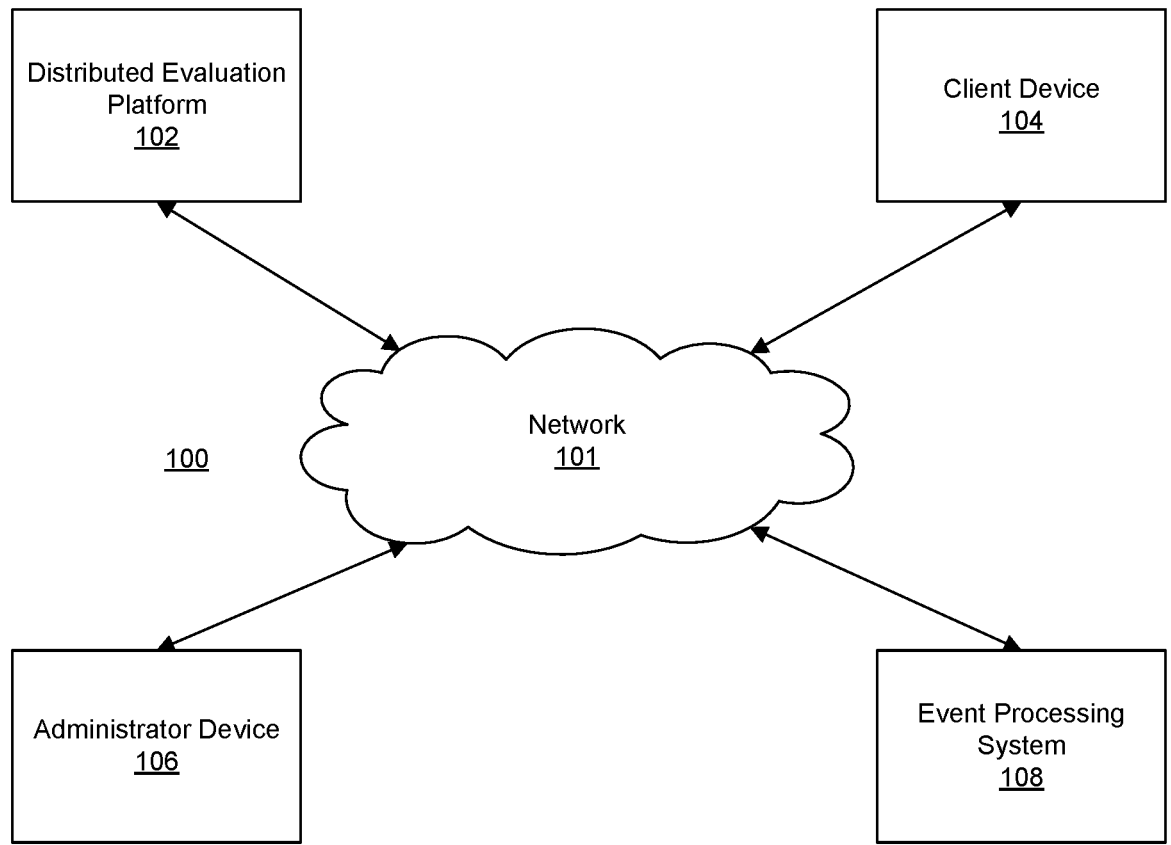
FIGS. 1A-1B depict an illustrative computing environment for evaluating NFTs through virtual token cloning and using a machine learning model in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for evaluating NFTs and reducing data use requirements. Users of a set of data (that may, e.g., be used by a payment processing system such as one managed by a financial institution) may require validation of a substantial amount of data (e.g., bulk transaction files) to complete an event processing request (e.g., a payment processing request). Validation of the data may require applying a number of test cases to validate all of the data needed to complete the event processing request. Regional and enterprise-specific laws may vary for different entities and further complicate the validation process. Even with multiple checks, there can still be a chance of an error (e.g., an invalid payment and/or a duplicate payment). Additionally, failure of a single test case may require retesting of the entire set of data once a fix is in place, leading to inefficient data processing (e.g., unexpected delays in payments). Accordingly, systems may generate NFTs based on subsets of the data (e.g. generating an NFT based on the information in each file in a bulk set of transaction files). These NFTs may be used to create virtual clones (e.g., soft tokens) based on the number of test cases to be applied to the information comprising the NFT. For example, a virtual clone may be generated for each test that is to be applied to the NFT. The test cases may then be applied to each corresponding virtual clone. In some examples, one or more of the virtual clones may fail a test case. The system may use a machine learning model to identify remediation actions (e.g., replacing incorrect information). These remediation actions may be used to generate child virtual clones (e.g., remedial tokens) comprising both the information from the original virtual clone and the remediation action. The test cases may be reapplied to these child virtual clones and, upon passing the test case, the child virtual clones may overwrite the original NFTs with the remediation action. The system may additionally or alternatively use the machine learning model to identify whether to first send the child virtual clones to the user to receive user input on whether or not to implement the remediation actions. The system may then continue to train the machine learning model based on the remediation actions and user input.

Figure 1B:
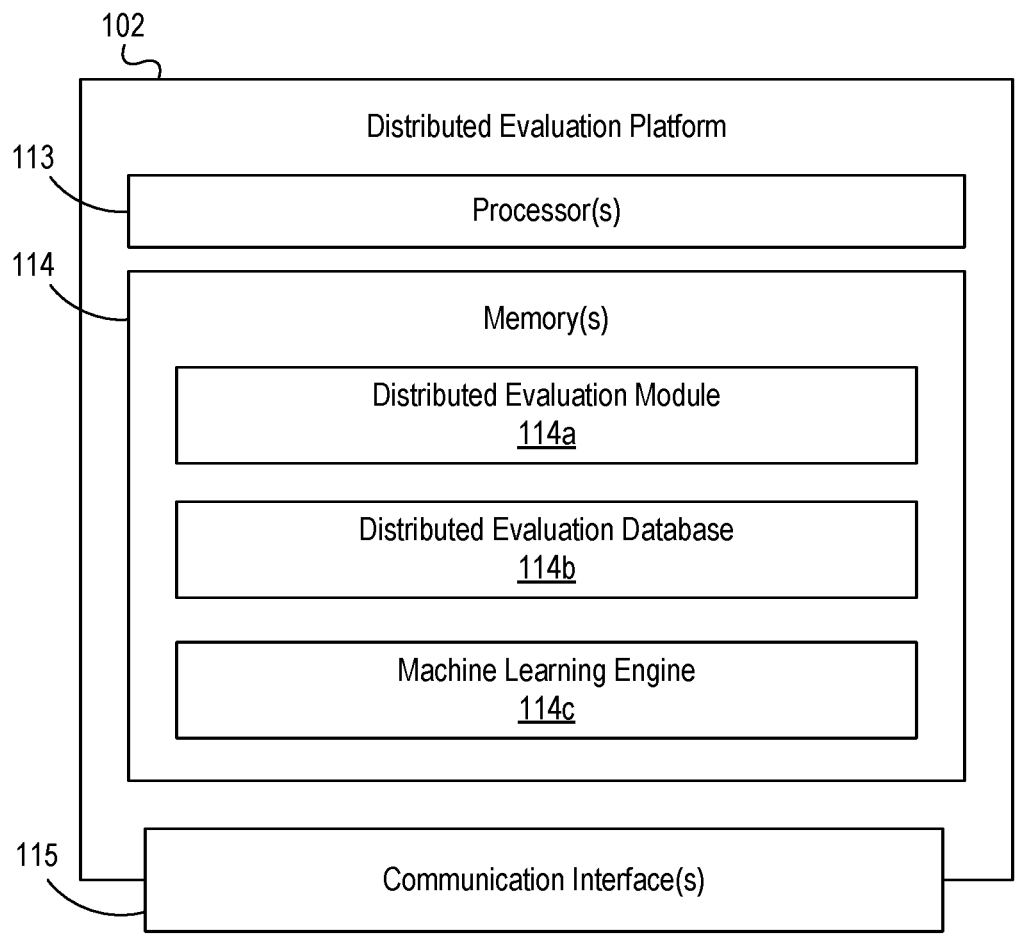

FIGS. 1A-1B depict an illustrative computing environment for evaluating NFTs through virtual token cloning using a machine learning model in accordance with one or more example embodiments. Referring to FIG. 1A, computing environment 100 may include one or more computer systems. For example, computing environment 100 may include a distributed evaluation platform 102, a client device 104, an administrator device 106, and an event processing system 108.

As described further below, distributed evaluation platform 102 may be a computer system that includes one or more computing devices (e.g., servers, server blades, or the like) and/or other computer components (e.g., processors, memories, communication interfaces) that may be used to configure, train and/or execute one or more machine learning models. For example, the distributed evaluation platform 102 may train the one or more machine learning models to generate remediation actions corresponding to file test case errors. Additionally or alternatively, distributed evaluation platform 102 may train the one or more machine learning models to identify whether or not to send remedial tokens to the user for user input. In some instances, distributed evaluation platform 102 may be controlled or otherwise maintained by an enterprise organization such as a financial institution.

Client device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., providing data for an event processing request, storing data, and/or other functions). In one or more instances, client device 104 may correspond to a first user (who may, e.g., be an employee or client of the enterprise organization such as a financial institution). In one or more instances, the client device 104 may be configured to communicate with one or more systems (e.g., distributed evaluation platform 102 and/or other systems) to perform a data transfer, request data validation, perform machine learning model configuration/training, and/or to perform other functions. In some instances, the client device 104 may be configured to display one or more graphical user interfaces (e.g., remediation action manual selection interfaces, remediation action bypass interfaces, token validation confirmation interfaces, potential unauthorized activity notification interfaces, and/or other interfaces).

Administrator device 106 may be a computing device (e.g., laptop computer, desktop computer, mobile device, tablet, smartphone, server, server blade, and/or other device) and/or other data storing or computing component (e.g., processors, memories, communication interfaces, databases), similar to client device 104, which may be used to transfer data between users and/or other user functions (e.g., providing test cases to validate data, storing data, and/or performing other functions). In one or more instances, administrator device 106 may correspond to a second user (who may, e.g., be an employee or client of an enterprise organization such as a financial institution). In one or more instances, the second user may be different from the first user. In one or more instances, the administrator device 106 may be configured to communicate with one or more systems (e.g., distributed evaluation platform 102 and/or other systems) to perform data transfer, perform machine model configuration/training, validate data, and/or to perform other functions.

Event processing system 108 may be one or more computer devices (e.g., servers, server blades, or the like) and/or other computer components (e.g., processors, memories, communication interfaces) that may be used to process event processing requests (e.g., transaction requests, fund transfer requests, withdrawal requests, payment processing requests, and/or other requests). In some instances, event processing system 108 may be configured to communicate with distributed evaluation platform 102 to receive and process event processing requests.

Computing environment 100 also may include one or more networks, which may interconnect distributed evaluation platform 102, client device 104, administrator device 106, and event processing system 108. For example, computing environment 100 may include a network 101 (which may interconnect, e.g., distributed evaluation platform 102, client device 104, administrator device 106, and event processing system 108).

In one or more arrangements, distributed evaluation platform 102, client device 104, administrator device 106, and event processing system 108 may be any type of computing device capable of sending and/or receiving requests and processing the requests accordingly. For example, distributed evaluation platform 102, client device 104, administrator device 106, and event processing system 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of distributed evaluation platform 102, client device 104, administrator device 106, and event processing system 108, may, in some instances, be special-purpose computing devices configured to perform specific functions.

Referring to FIG. 1B, distributed evaluation platform 102 may include one or more processors 113, memory 114, and communication interface 115. A data bus may interconnect processor 113, memory 114, and communication interface 115. Communication interface 115 may be a network interface configured to support communication between distributed evaluation platform 102 and one or more networks (e.g., network 101, or the like). Communication interface 115 may be communicatively coupled to the processor 113. Memory 114 may include one or more program modules having instructions that when executed by processor 113 cause distributed evaluation platform 102 to perform one or more functions described herein and/or one or more databases that may store and/or otherwise maintain information which may be used by such program modules and/or processor 113. In some instances, the one or more program modules and/or databases may be stored by and/or maintained in different memory units of distributed evaluation platform 102 and/or by different computing devices that may form and/or otherwise make up distributed evaluation platform 102. For example, memory 114 may have, host, store, and/or include distributed evaluation module 114a, distributed evaluation database 114b, and machine learning engine 114c.

Distributed evaluation module 114a may have instructions that direct and/or cause distributed evaluation platform 102 to evaluate NFTs through virtual token cloning and reduce data use requirements using a machine learning model. Distributed evaluation database 114b may have instructions causing distributed evaluation platform 102 to store NFTs, virtual clones, and virtual child clones (that may, e.g., be used to evaluate NFTs through virtual token cloning using a machine learning model). Machine learning engine 114c may contain instructions causing distributed evaluation platform 102 to train and/or implement a machine learning model (that may, e.g., be used to evaluate NFTs through virtual token cloning). In some instances, machine learning engine 114c may be used by distributed evaluation platform 102 and/or distributed evaluation module 114a to refine and/or otherwise update methods for NFT evaluation, and/or other methods described herein.

Figure 2A:
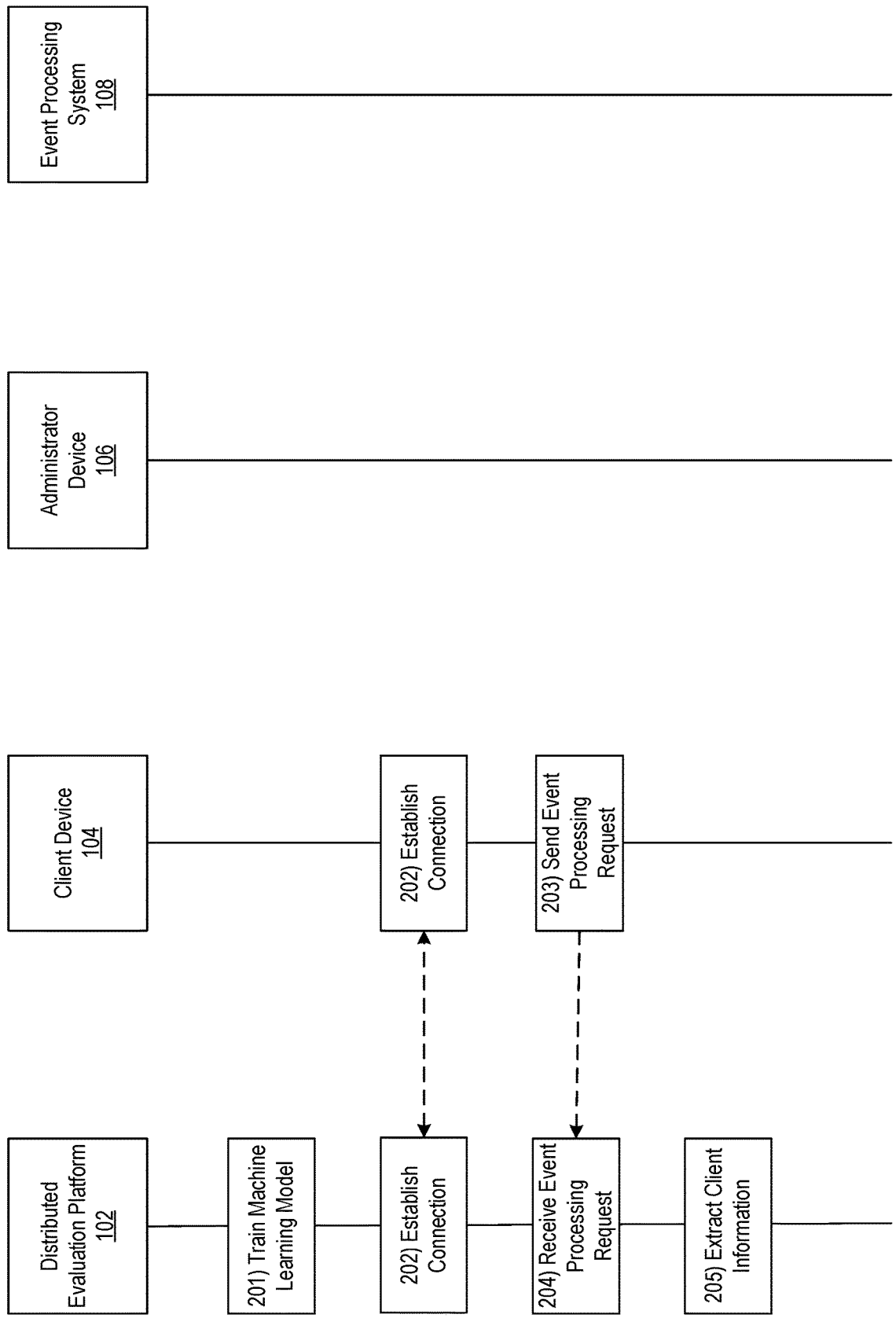

FIGS. 2A-2H depict an illustrative event sequence for evaluating NFTs through virtual token cloning using a machine learning model in accordance with one or more example embodiments. Referring to FIG. 2A, at step 201, distributed evaluation platform 102 may train a machine learning model. In some instances, the distributed evaluation platform 102 may configure and/or otherwise train the machine learning model based on historical NFTs and test cases (e.g., user identification requirements, requirements for processing requests originating from a particular region, requirements for processing requests from a particular enterprise system, and/or other requirements).

In some instances, to configure and/or otherwise train the machine learning model, distributed evaluation platform 102 may process all (or a subset) of the historical NFTs and test cases by applying natural language processing, natural language understanding, and/or other processing techniques/algorithms (e.g., supervised machine learning techniques) to generate and store one or more classification models.

For example, in configuring and/or otherwise training the machine learning model, distributed evaluation platform 102 may apply natural language processing to historical NFTs distributed evaluation platform 102 has previously evaluated and historical test cases used to validate information of the historical NFTs. For instance, the distributed evaluation platform 102 may identify that a historical NFT generated by a particular event processing request required a particular remediation action to pass the historical test cases. Additionally or alternatively, the distributed evaluation platform 102 may mine the historical NFTs to determine common remediation actions for particular event processing requests.

For example, based on the historical NFTs and test cases the distributed evaluation platform 102 may identify that all payment processing requests from a particular geographic region that require a regional identifier be added to the client information in order for the payment to be processed. In some instances, the distributed evaluation platform 102 may further configure and/or otherwise train the machine learning model by applying historical user acceptance information. For example, the distributed evaluation platform 102 may identify that the user has historically accepted a particular remediation action to overcome a validation error. In doing so, the distributed evaluation platform 102 may train the machine learning model to identify a likelihood of acceptance of various remediation actions (e.g., on a per user, per error, and/or other basis). In some instances, the distributed evaluation platform 102 may also set one or more acceptance thresholds, which may be dynamically adjustable based on identified errors, goals for increased/decreased automation, and/or otherwise. In these instances, the distributed evaluation platform 102 may use the machine learning model to compare the identified likelihoods of acceptance to the acceptance thresholds to identify whether or not automated performance of the corresponding remediation action should be performed (e.g., as described further below with regard to step 220).

At step 202, client device 104 may establish a connection with distributed evaluation platform 102. For example, client device 104 may establish a first wireless data connection with the distributed evaluation platform 102 to link the distributed evaluation platform 102 with the client device 104 (e.g., in preparation for sending an event processing request). In some instances, the client device 104 may identify whether or not a connection is already established with the distributed evaluation platform 102. If a connection is already established with the distributed evaluation platform 102, the client device 104 might not re-establish the connection. If a connection is not yet established with the distributed evaluation platform 102, the client device 104 may establish the first wireless data connection as described above.

At step 203, once a connection has been established, the client device 104 may send an event processing request to the distributed evaluation platform 102. For example, the client device 104 may send the event processing request via the communication interface 115 and while the first wireless data connection is established.

In some instances, in sending the event processing request, the client device 104 may send transaction requests, fund transfer requests, withdrawal requests, payment processing requests, and/or other requests. In some instances, in sending the event processing request, the client device 104 may additionally send client information, (e.g., payment files, transaction files, regional validation laws, administrator validation laws, bulk files, and/or other information) required to complete the event processing request. In some instances, the client device 104 may have received the event processing request from a user, an employee/client of an enterprise organization (e.g., a financial institution), and/or other sources.

At step 204, distributed evaluation platform 102 may receive the event processing request from client device 104. For example, the distributed evaluation platform 102 may receive the event processing request while the first wireless data connection is established.

At step 205, the distributed evaluation platform 102 may extract the client information from the event processing request. In extracting the client information, the distributed evaluation platform 102 may extract payment files, transaction files, regional validation laws, administrator validation laws, bulk files, and/or other information.

Figure 2B:
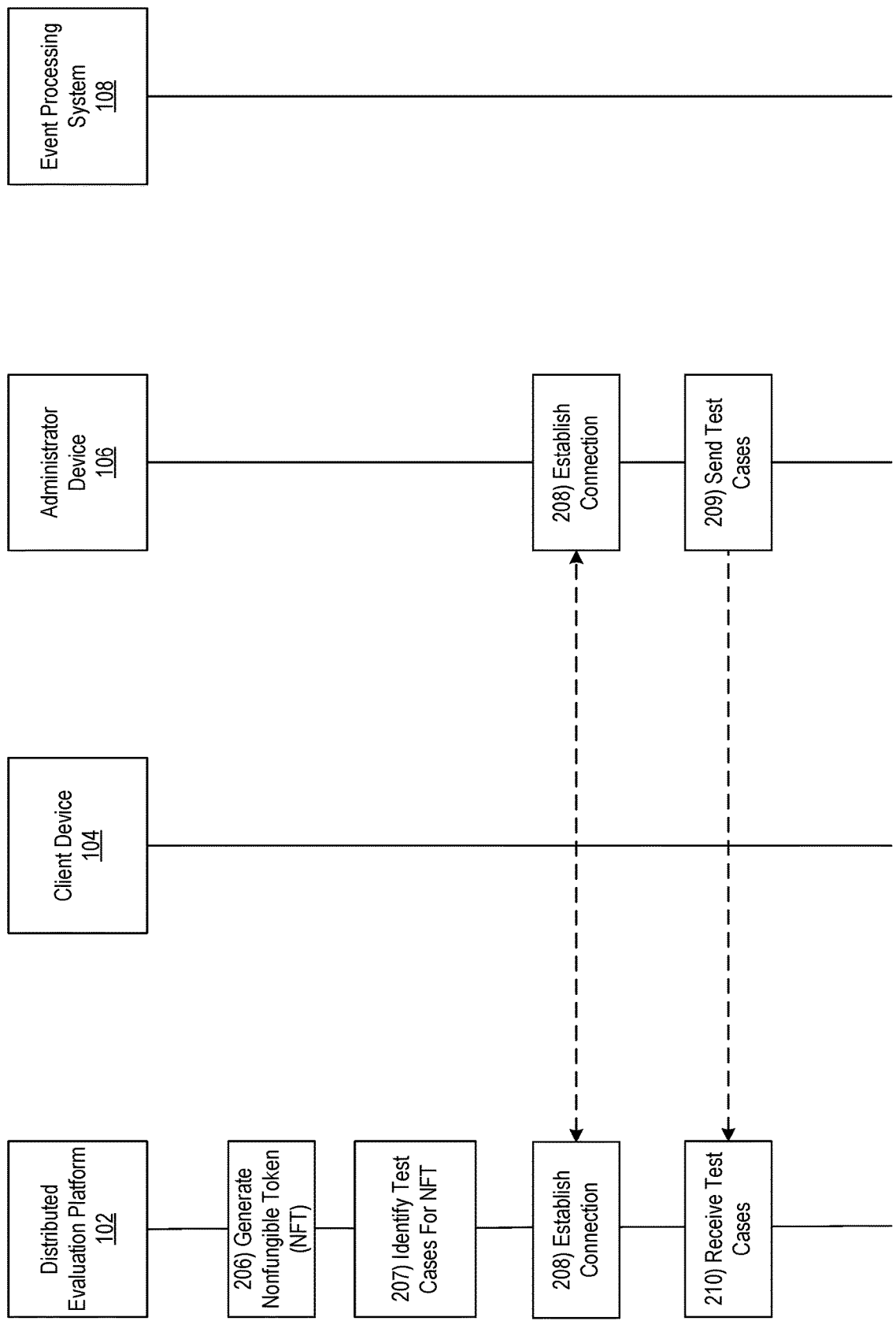

Referring to FIG. 2B, at step 206, once the client information has been extracted, the distributed evaluation platform 102 may generate NFTs based on the client information. In some instances, the NFTs may each correspond to a subset of the client information. For example, the client information may comprise multiple payment files and a single NFT may correspond to each payment file. The NFTs may include particular subsets of the client information needed to validate the NFT (e.g., user information (such as social security numbers), account information (such as passwords), biometric information (such as a fingerprint), and/or other information).

At step 207, the distributed evaluation platform 102 may identify test cases for the NFTs generated at step 206. In identifying the test cases for the NFTs, the distributed evaluation platform 102 may use the client information to determine validation requirements for the NFTs. For example, the distributed evaluation platform 102 may determine that particular administrator validation laws or regulations (e.g., requiring a password, requiring a username, requiring an authentication key, and/or other requirements) apply to the event processing request and must be satisfied by the NFTs. Based on determining the validation requirements for the NFTs, the distributed evaluation platform 102 may identify the test cases for the NFTs. For example, the distributed evaluation platform 102 may identify that a test case is needed to validate a password, a username, an authentication key, biometric information, and/or other information.

At step 208, administrator device 106 may establish a connection with distributed evaluation platform 102. For example, administrator device 106 may establish a second wireless data connection with the distributed evaluation platform 102 to link the distributed evaluation platform 102 with the administrator device 106 (e.g., in preparation for sending test cases). In some instances, the administrator device 106 may identify whether or not a connection is already established with the distributed evaluation platform 102. If a connection is already established with the distributed evaluation platform 102, the administrator device 106 might not re-establish the connection. If a connection is not yet established with the distributed evaluation platform 102, the administrator device 106 may establish the second wireless data connection as described above.

At step 209, once a connection has been established, the administrator device 106 may send the test cases to the distributed evaluation platform 102 in response to a request from distributed evaluation platform 102. For example, the administrator device 106 may send the test cases via the communication interface 115 and while the second wireless data connection is established. In some instances, in sending the test cases, the administrator device 106 may send the particular test cases identified by the distributed evaluation platform at 102. For example, the administrator device 106 may send test cases to validate specific user identification requirements (e.g., a password, social security number, biometric information, and/or other requirements). In some instances, the administrator device 106 may send additional test cases not identified by the distributed evaluation platform 102 but required or identified by the administrator device 106. For example, the administrator device 106 may send test cases to fulfill requirements imposed by the owner of the administrator device 106 (e.g., a financial institution). In some instances, the administrator device 106 may have a stored database of test cases. In sending the test cases, the administrator device 106 may send test cases contained in the stored database.

Additionally or alternatively, in some examples the distributed evaluation platform 102 may have a stored database of test cases stored in memory (e.g., internal memory). In these examples, the distributed evaluation platform 102 might not request the test cases from the administrator device 106, and the administrator device 106 might not send the test cases to the distributed evaluation platform 102.

At step 210, distributed evaluation platform 102 may receive the test cases from the administrator device 106. For example, the distributed evaluation platform 102 may receive the test cases via the communication interface 115 and while the second wireless data connection is established. In some instances, the distributed evaluation platform 102 may store the test cases in internal memory of distributed evaluation platform 102, and/or external memory. In some instances, once the distributed evaluation platform 102 receives the test cases, the distributed evaluation platform 102 may store the test cases, so as to reduce back and forth communication (e.g., and conserve network bandwidth) between the distributed evaluation platform 102 and the administrator device 106 each time test cases are identified (though in some instances, the distributed evaluation platform 102 may periodically communicate with the administrator device 106 to synchronize updated test cases).

Figure 2C:
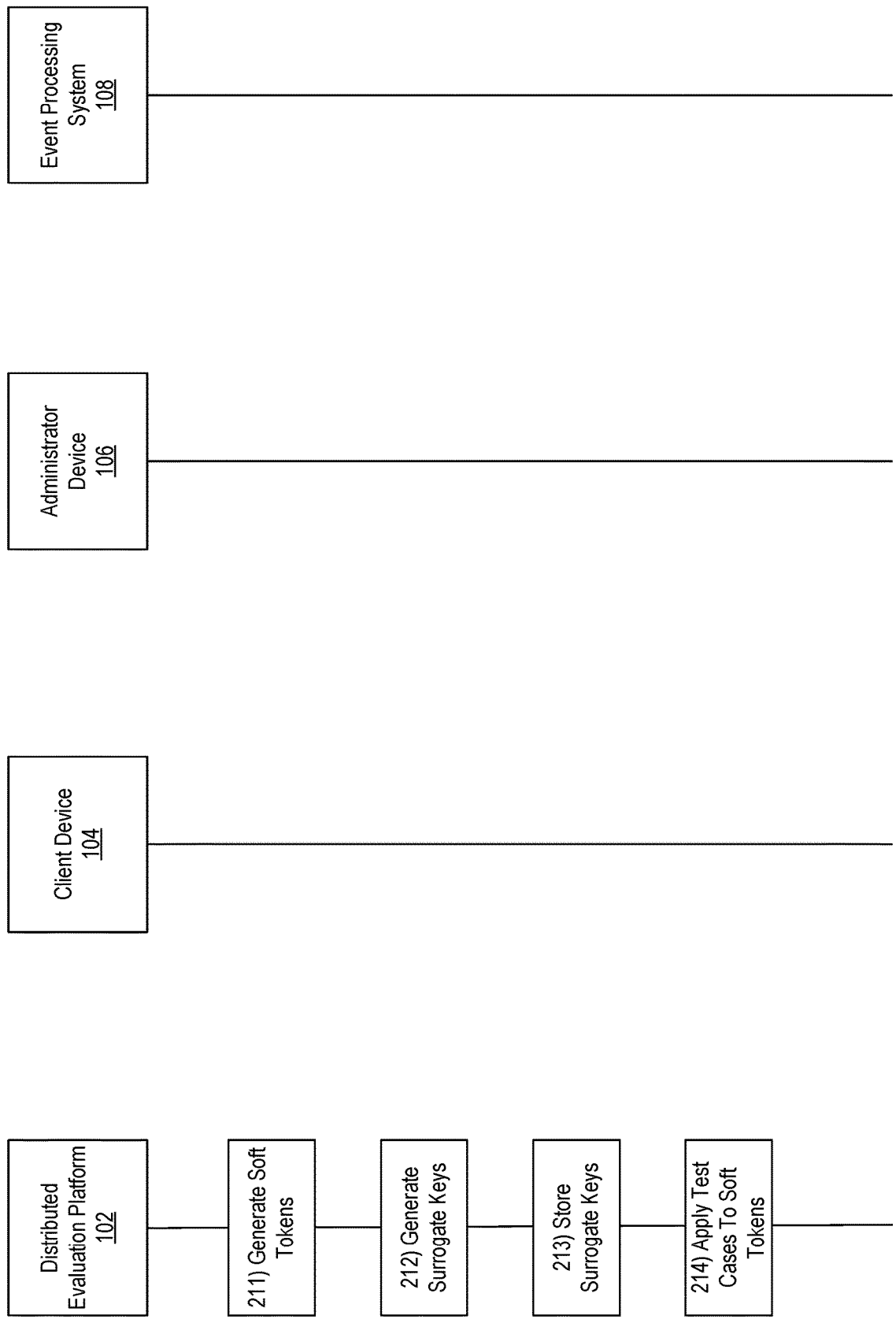

Referring to FIG. 2C, at step 211 the distributed evaluation platform 102 may generate one or more soft tokens based on the NFTs and the test cases. In generating the soft tokens, the distributed evaluation platform 102 may generate one or more digital clones of the NFTs. In some instances, the distributed evaluation platform 102 may base the number of soft tokens generated on the number of test cases for each NFT. For example, a particular NFT may have four test cases that will be applied to it, and the distributed evaluation platform 102 may generate four soft tokens from that NFT as a result.

At step 212, the distributed evaluation platform 102 may generate one or more surrogate keys based on the soft tokens. In some instances, each surrogate key may be a sequentially generated value (e.g., a hash value, integer value, and/or other value) corresponding to each NFT. The surrogate keys may link the soft tokens to the NFT used to generate each soft token. For example, sequentially generated surrogate keys (e.g., 1a, 1b, and 1c) may link three soft tokens (e.g., Soft Token A, Soft Token B, and Soft Token C) to the parent NFT (e.g. NFT 1).

At step 213, the distributed evaluation platform 102 may store the surrogate keys. In some instances, the distributed evaluation platform 102 may store the surrogate keys (e.g., along with a correlation between the corresponding soft token/NFT pair) in internal memory of distributed evaluation platform 102, and/or external memory.

At step 214, the distributed evaluation platform 102 may apply the test cases to the soft tokens. In some instances, the distributed evaluation platform 102 may apply a particular test case to each soft token. For example, the distributed evaluation platform 102 may test whether one soft token has a correct password to access an account (e.g., a bank account), while testing whether another soft token indicates an account balance is sufficient to complete a payment processing request.

Referring to FIG. 2D, at step 215 the distributed evaluation platform 102 may flag the soft tokens based on application of the test cases at step 214. In flagging the soft tokens, distributed evaluation platform 102 may flag each soft token with a pass or fail flag (e.g., a digital identifier, index key, digital flag, and/or other indicators). For example, if a soft token is found to hold a correct password after a test case is applied, distributed evaluation platform 102 may input a digital indicator that the test case passed to the metadata of the soft token. In another example, if a soft token is found to contain information relating to an invalid internet protocol (IP) address, distributed evaluation platform 102 may input a digital indicator that the test case failed into the metadata of the soft token.

At step 216, distributed evaluation platform 102 may input one or more soft tokens with fail flags into the machine learning model in order to generate one or more remediation actions. In some instances, each remediation action may correspond to a particular soft token. The remediation actions may be or include a suggested action (e.g., change entered information, cancel a request, transfer funds, and/or other actions). Additionally or alternatively, the remediation actions may be or include automatic actions (e.g., rejecting a request, denying access to an account, and/or other actions). In some instances, one or more of the remediation actions may be actions that require user input to execute. For example, upon receiving a soft token with a fail flag indicating an incorrect password, the machine learning model may generate a remediation action suggesting a new password be entered by the user. In some examples, one or more of the remediation actions may be actions that execute automatically without any user input. For example, upon receiving a soft token with a fail flag indicating insufficient account balance to complete a payment processing request, the machine learning model may generate a remediation action automatically rejecting the payment processing request.

At step 217, the distributed evaluation platform 102 may generate one or more remedial tokens based on the soft tokens with fail flags and the remediation actions generated at step 216. In generating the remedial tokens, the distributed evaluation platform 102 may generate one or more digital clones of the soft tokens (e.g., a child token). The clones of the soft tokens may be modified to incorporate the remediation action corresponding to the soft token. For example, a soft token with a fail flag indicating an unknown client device may be modified to include a remediation action automatically rejecting the device's request. In some instances, the distributed evaluation platform 102 may link the remedial tokens to surrogate keys corresponding to the soft token used to generate each remedial token. For example, a surrogate key (e.g., 1a), linked to a soft token (e.g., Soft Token A), may be linked to a remedial token generated using that soft token (e.g., Remedial Token A1).

At step 218, the distributed evaluation platform 102 may apply the test cases to the remedial tokens. In applying the test cases to the remedial tokens, the distributed evaluation platform 102 may apply the same test case to each remedial token as was applied to the remedial token's corresponding soft token at step 214. For example, the distributed evaluation platform 102 may test whether one remedial token has a correct password to access an account (e.g., a bank account), while testing whether another remedial token indicates an account balance is sufficient to complete a payment processing request. In doing so, the distributed evaluation platform 102 may effectively simulate whether the remediation action may address the identified failure for the corresponding soft token (and thus for the NFT itself).

Figure 2E:
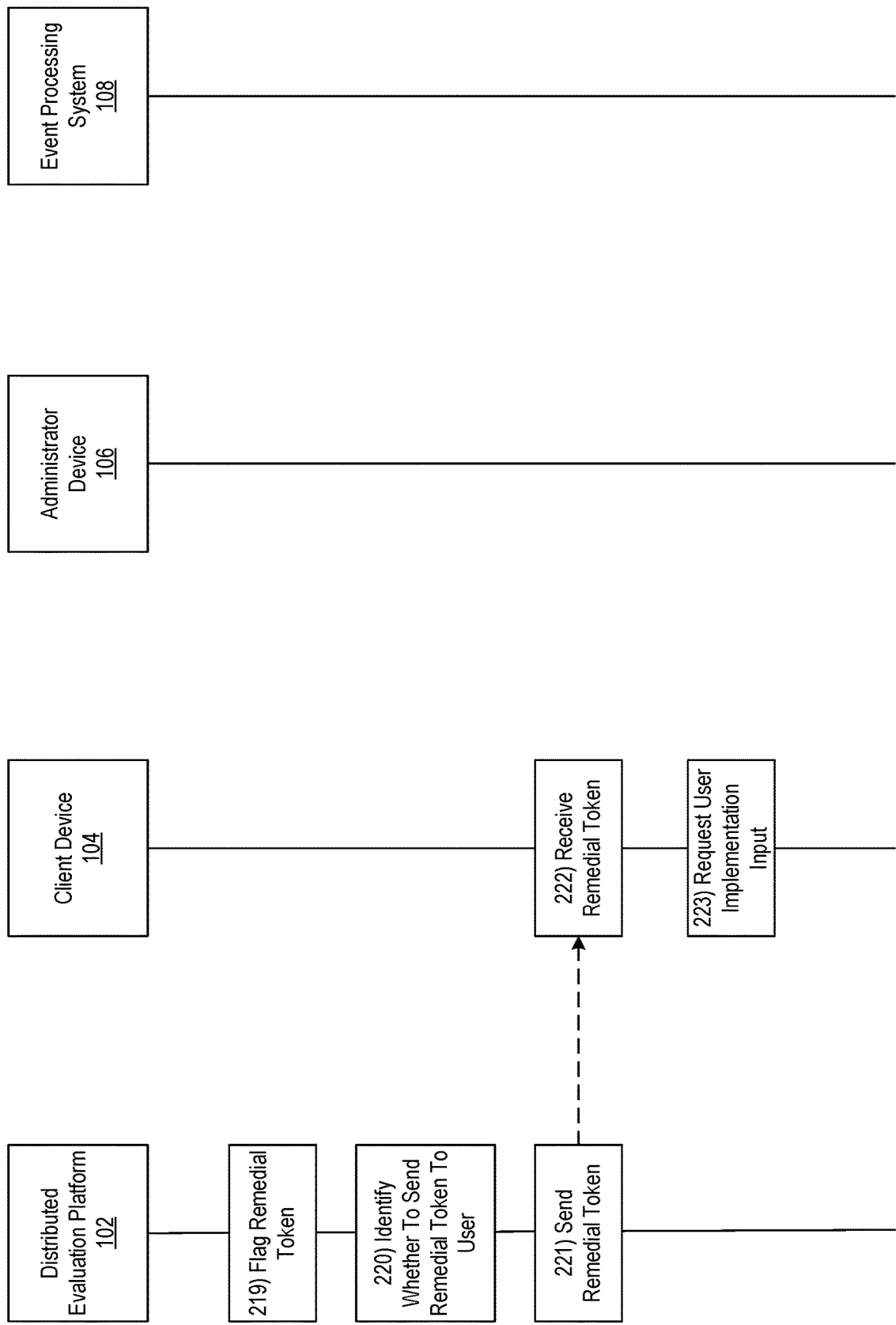

Referring to FIG. 2E, at step 219 the distributed evaluation platform 102 may flag the remedial tokens based on application of the test cases at step 218. In flagging the remedial tokens, distributed evaluation platform 102 may flag each remedial token with a pass or fail flag (e.g., a digital identifier, index key, digital flag, and/or other indicators). For example, if a remedial token is found to hold a correct password after a test case is reapplied, distributed evaluation platform 102 may input a digital indicator that the test case passed to the metadata of the remedial token. In another example, if a remedial token is still found to contain information relating to an invalid internet protocol (IP) address, distributed evaluation platform 102 may input a digital indicator that the test case failed to the metadata of the remedial token. For example, the distributed evaluation platform 102 may perform similar actions as those described above at step 215 with regard to the soft tokens. In some instances, based on the remediation action, the distributed evaluation platform 102 may additionally identify some or all of the client information as potentially unauthorized information. For example, the remediation action may indicate that the soft token failed the corresponding test case due to an unauthenticated link between a user device and the client information. The distributed evaluation platform 102 may flag the potentially unauthorized information with a potential unauthorized activity flag. In some examples, the distributed evaluation platform 102 may send a potential unauthorized activity alert, based on identifying some or all of the client information as potentially unauthorized information, to the client device 104 (e.g., as part of sending the remedial token at step 221 described below).

At step 220, the distributed evaluation platform 102 may input the flagged remedial tokens into the machine learning model to identify whether to send the remedial tokens to the user. For example, the machine learning model may identify all remedial tokens with passed flags as tokens to send to the user. In some instances, in identifying whether to send the remedial tokens to the user, the machine learning model may compare the historical NFTs with the remedial tokens (e.g., compare historically proposed remediation actions with user feedback/acceptance information for the given NFT, the user, and/or otherwise). For example, the machine learning model may compare a remedial token with a historical NFT owned by the user that implemented the remediation action associated with the remedial token. If the machine learning model detects that the remediation action suggested by the remedial token has previously been accepted by the user, the machine learning model may determine not to send the remedial token to the user and may automatically implement the remediation action. In some instances, the distributed evaluation platform 102 may train the machine learning model to employ a remediation frequency algorithm to determine whether to automatically implement the remediation action. In some examples, the remediation frequency algorithm may use the remedial tokens and the historical NFTs to determine whether to automatically implement the remediation action. In some instances, the remediation frequency algorithm may include dividing the number of historical NFTs that implement a remediation action contained in a remedial token by the total number of historical NFTs. For example, the distributed evaluation platform 102 may execute the following remediation frequency algorithm:

$$\frac{\text{(Number of historical NFTs containing remediation action)}}{\text{(Total number of historical NFTs)}} = \text{Result.}$$

The algorithm may include comparing the result to a threshold value. For example, the following constraints/parameters: If Result>0.5, the remediation action will automatically be implemented, but if Result≤0.5, the remediation action will not automatically be implemented.

Additionally or alternatively, in some examples the machine learning model may determine not to send one or more remedial tokens to the user because the one or more remedial tokens have a fail flag. Based on or in response to a determination not to send one or more remedial tokens to the user because of a fail flag, the distributed evaluation platform 102 may repeat the process starting at step 216 with the remedial tokens with fail flags.

At step 221, the distributed evaluation platform 102 may send the remedial tokens to client device 104. For example, the distributed evaluation platform 102 may send the remedial tokens via the communication interface 115 and while the first wireless data connection is established. In some examples, the distributed evaluation platform 102 may send only the remedial tokens with passed flags to client device 104. In some instances, the distributed evaluation platform 102 may additionally send the client device 104 one or more commands directing the client device 104 to display information corresponding to the remedial tokens to the user.

At step 222, the client device 104 may receive the remedial tokens from the distributed evaluation platform 102. For example, the client device 104 may receive the remedial tokens from the distributed evaluation platform 102 via the communication interface 115 and while the first wireless data connection is established. In some examples, the client device 104 may additionally receive the one or more commands directing the client device 104 to display information corresponding to the remedial tokens to the user. Based on or in response to the one or more commands to display information corresponding to the remedial tokens, the client device 104 may display a token validation interface. In some instances, the token validation interface may be configured to receive user input through the client device 104.

For example, in displaying the token validation interface, the client device 104 may display a graphical user interface similar to token validation confirmation interface 300, which is illustrated in FIG. 3A. Referring to FIG. 3A, in some instances, the token validation confirmation interface 300 may include information corresponding to the remedial tokens. For example, token validation confirmation interface 300 may include information corresponding to the remedial tokens such as the event that the NFT evaluation is required for, the test case failure that led to the creation of a remedial token, the remediation action implemented by the machine learning model to resolve the test case failure, the result of successful token validation after the remediation action is implemented, and/or other information.

Additionally or alternatively, the client device 104 may display a potential unauthorized activity notification interface. For example, the client device 104 may display the potential unauthorized activity notification interface based on or in response to receiving a potential unauthorized activity alert from distributed evaluation platform 102. In displaying the potential unauthorized activity notification interface, the client device 104 may display a graphical user interface similar to potential unauthorized activity notification interface 310, which is illustrated in FIG. 3B. Referring to FIG. 3B, in some instances, the potential unauthorized activity notification interface 310 may include information corresponding to the remedial tokens such as the event NFT evaluation is required for, the test case failure that led to the creation of a remedial token, the remediation action implemented by the machine learning model to resolve the test case failure, the result of unsuccessful token validation, an unauthorized activity warning based on the test case failure, and/or other information.

Figure 3C:
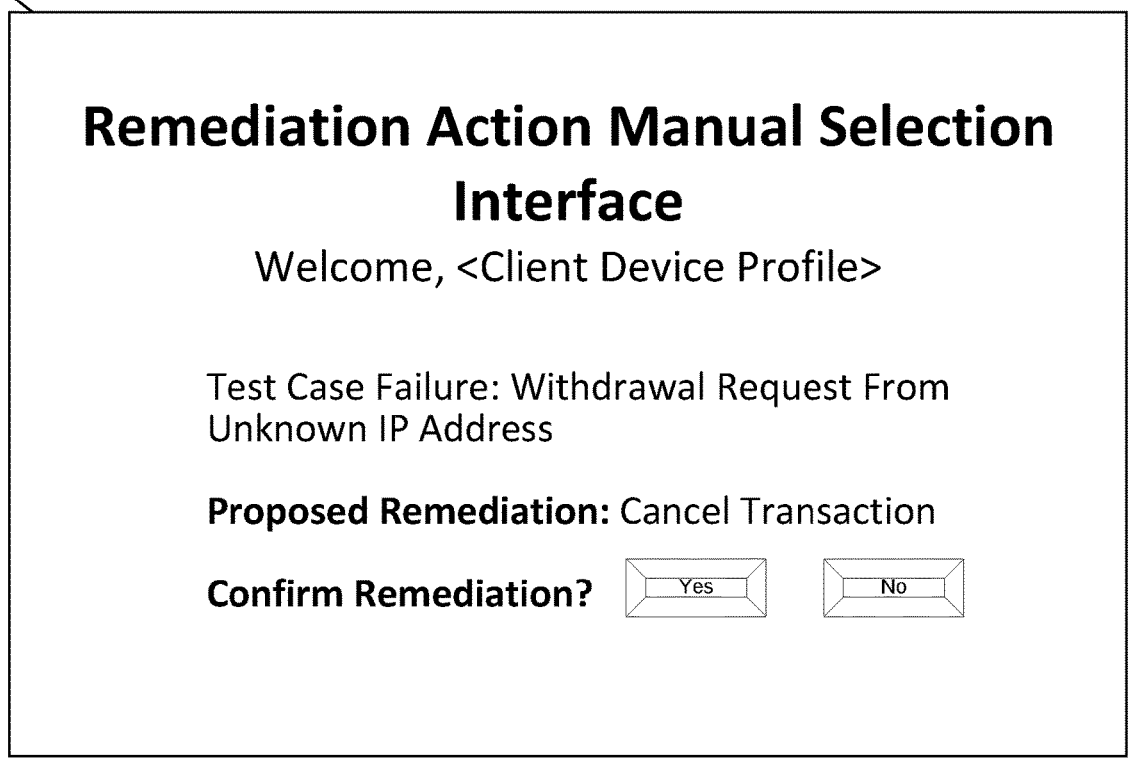

Additionally or alternatively, the client device 104 may display a remediation action manual selection interface. For example, in displaying the remediation action manual selection interface, the client device 104 may display a graphical user interface similar to remediation action manual selection interface 320, which is illustrated in FIG. 3C. Referring to FIG. 3C, in some instances, the remediation action manual selection interface 320 may include information corresponding to the remedial tokens such as the test case failure that led to the creation of a remedial token, the remediation action suggested by the machine learning model to resolve the test case failure, and/or other information. The remediation action manual selection interface 320 may also display input mechanisms requesting user input. For example, the client device 104 may display one or more of: a button or buttons, toggle or toggles, check box or boxes, and/or other selectable interface elements. For example, as illustrated in FIG. 3C the input mechanisms may be buttons the user can select to decide whether or not to implement the suggested remediation action.

Figure 3D:
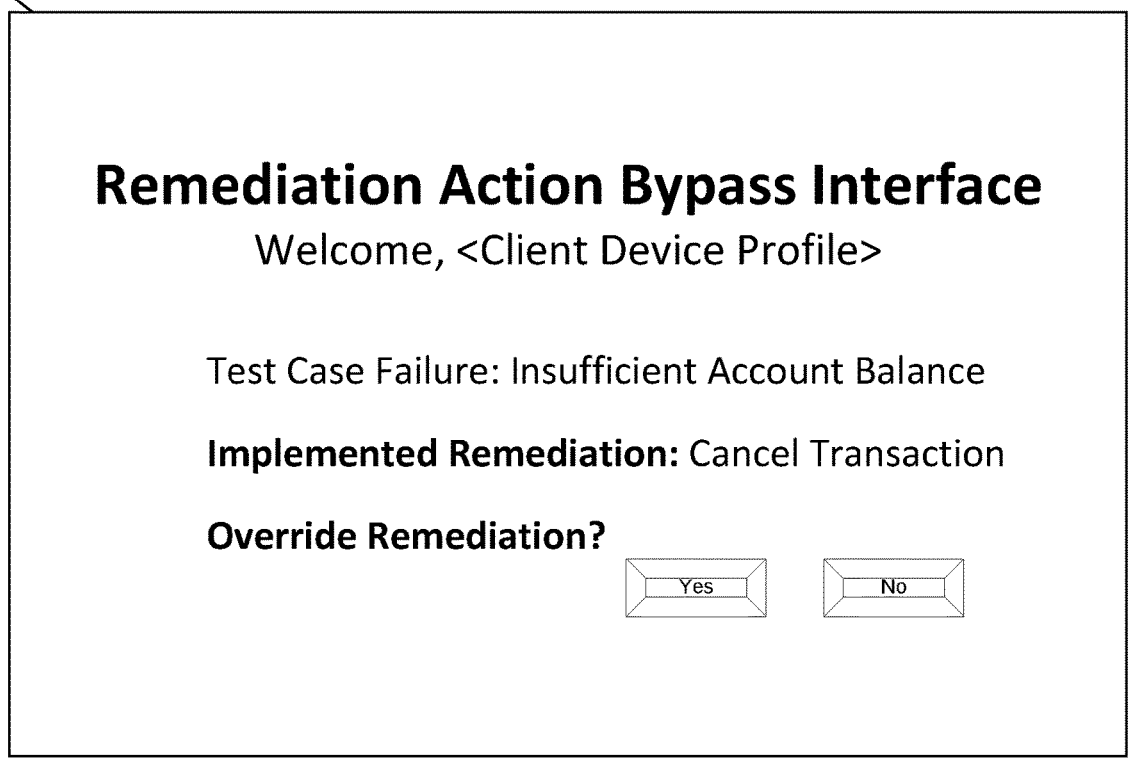

Additionally or alternatively, the client device 104 may display a remediation action bypass interface. For example, in displaying the remediation action bypass interface, the client device 104 may display a graphical user interface similar to remediation action bypass interface 330, which is illustrated in FIG. 3D. Referring to FIG. 3D, in some instances, the remediation action bypass interface 330 may include information corresponding to the remedial tokens such as the test case failure that led to the creation of a remedial token, the remediation action automatically implemented by the machine learning model to resolve the test case failure, and/or other information. The remediation action bypass interface 330 may also display input mechanisms requesting user input. For example, the client device 104 may display one or more of: a button or buttons, toggle or toggles, check box or boxes, and/or other interface elements. For example, as illustrated in FIG. 3D the input mechanisms may be buttons the user can select to decide whether or not to override a remediation action the distributed evaluation platform 102 implemented at step 220.

With further reference to FIG. 2E, at step 223 the client device 104 may request user implementation input from the user. In some instances, the client device 104 may request that the user decide whether to implement a particular remediation action. For example, the client device 104 may request user implementation input through a remediation action manual selection interface, such as remediation action manual selection interface 320 illustrated in FIG. 3C. In other instances, the client device 104 may request that the user decide whether to override a remediation action implemented by the distributed evaluation platform 102. For example, the client device 104 may request user implementation input through a remediation action bypass interface, such as remediation action bypass interface 330 illustrated at FIG. 3D.

Figure 2F:
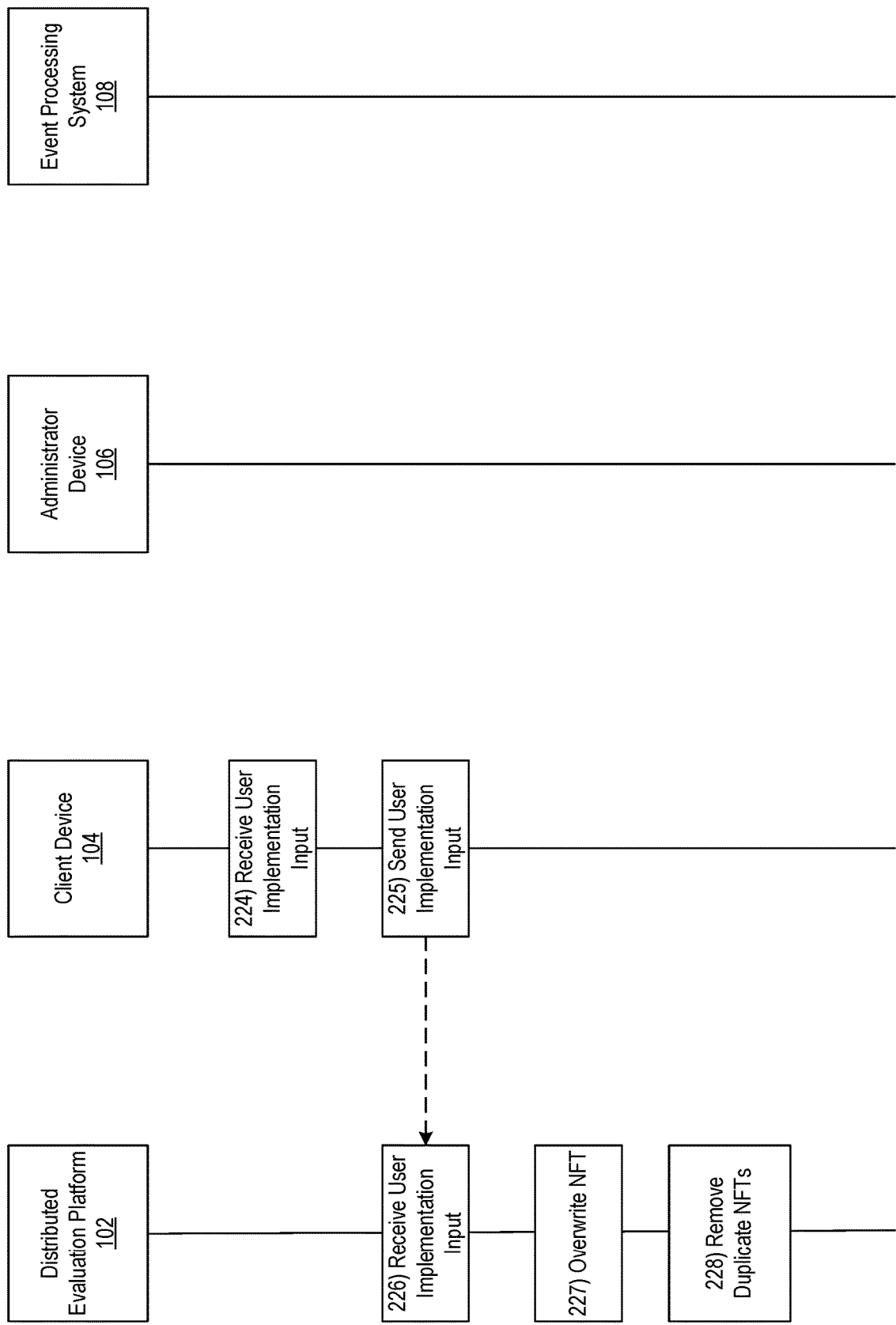

Referring to FIG. 2F, at step 224 the client device 104 may receive the user implementation input. For example, the client device 104 may receive user input confirming implementation of a remediation action, user input rejecting implementation of a remediation action, user input bypassing automatic implementation of a remediation action, and/or other input.

At step 225 the client device 104 may send the user implementation input to the distributed evaluation platform 102. For example, the client device 104 may send the user implementation input via the communication interface 115 and while the first wireless data connection is established. In some instances, the client device 104 may additionally send the distributed evaluation platform 102 one or more commands directing the distributed evaluation platform 102 to modify the remediation actions corresponding to the remedial tokens. For example, the client device 104 may send, based on the user implementation input, one or more commands directing the distributed evaluation platform 102 to confirm implementation of a remediation action, reject implementation of a remediation action, bypass automatic implementation of a remediation action, and/or other input.

At step 226, the distributed evaluation platform 102 may receive the user implementation input from the client device 104. For example, the distributed evaluation platform 102 may receive the user implementation input from client device 104 via the communication interface 115 and while the first wireless data connection is established. In some examples, the distributed evaluation platform 102 may additionally receive the one or more commands directing the distributed evaluation platform 102 to modify the remediation actions corresponding to the remedial tokens.

In some instances, steps 224-226 may be optional, and might not be performed where the distributed evaluation platform 102 makes an automated decision to execute a remediation action without user input.

At step 227, the distributed evaluation platform 102 may overwrite the NFTs based on the remedial tokens. For example, a remedial token may correspond to a remediation action requiring that the user's signature be included in payment processing requests. The NFT may then be modified to include the user's signature, extracted from the client information. In some instances, the distributed evaluation platform 102 may determine whether or not to overwrite the NFTs based on or in response to the one or more commands directing the distributed evaluation platform 102 to modify the remediation actions corresponding to the remedial tokens received at step 226. Additionally or alternatively, the distributed evaluation platform 102 may have automatically identified whether or not to perform the overwrite, and may perform (or not perform) the overwrite based on this identification.

In some examples, in overwriting the NFTs, the distributed evaluation platform 102 may delete an NFT linked to the same surrogate key as one or more remedial tokens. The distributed evaluation platform 102 may replace the deleted NFT with the one or more remedial tokens. For example, two remedial tokens (e.g., Remedial Token A1 and Remedial Token B1), each corresponding to a different remediation action, may each link to a different surrogate key (e.g. Key X and Key Y). Both surrogate keys may link to a single NFT (e.g., NFT 1). In this instance, distributed evaluation platform 102 may delete the NFT (e.g., NFT 1) linked to the surrogate keys (e.g., Key X and Key Y) and replace it with a new NFT comprising the remediation actions corresponding to each remedial token (e.g., Remedial Token A1 and Remedial Token B1).

At step 228, the distributed evaluation platform 102 may remove any duplicate NFTs. In removing the duplicate NFTs, the distributed evaluation platform 102 may compare one or more of the NFTs overwritten at step 227 with one or more of the historical NFTs. For example, the distributed evaluation platform 102 may compare the information contained in an NFT with the information contained in a historical NFT and determine that the NFTs contain identical information. Based on the determination that the NFT and the historical NFT are identical, the distributed evaluation platform 102 may discard, delete, or otherwise dispose of one of the duplicate NFTs. In some instances, removing the duplicate NFTs may provide increased security. For example, removing duplicate NFTs may reduce the likelihood of a second user gaining access to the information belonging to the owner of the NFT. Additionally, removing the duplicate NFTs may increase available memory and/or other processing resources of the distributed evaluation platform 102 and/or other computing systems.

Figure 2G:
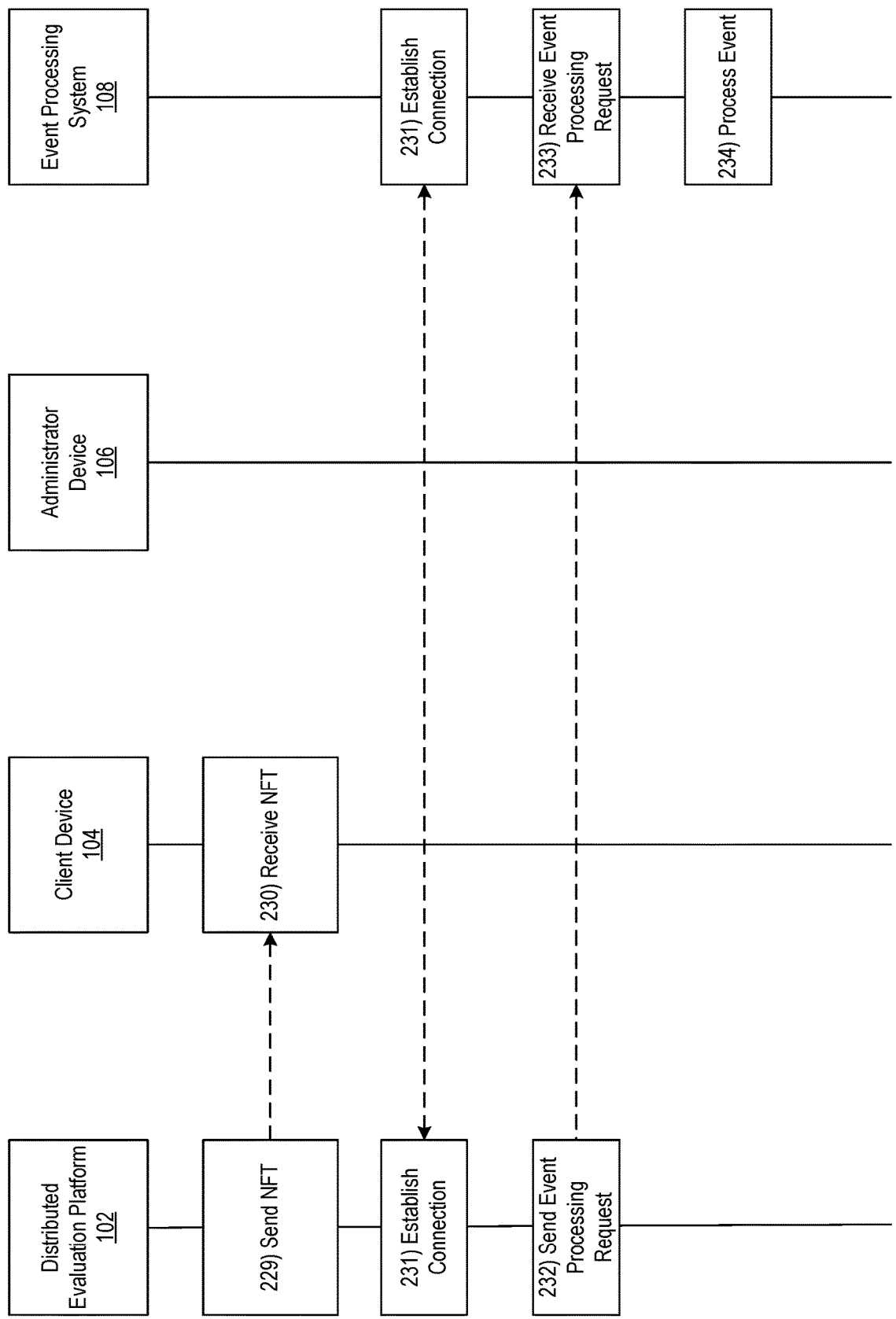

Referring to FIG. 2G, at step 229 the distributed evaluation platform 102 may send the NFTs to client device 104. For example, the distributed evaluation platform 102 may send the NFTs via the communication interface 115 and while the first wireless data connection is established. In some examples, the distributed evaluation platform 102 may send only NFTs overwritten with remedial tokens in step 227 to client device 104. In some examples, the distributed evaluation platform 102 may additionally send the remaining NFTs generated at step 206 that were not overwritten by remedial tokens.

At step 230, the client device 104 may receive the NFTs from the distributed evaluation platform 102. For example, the client device 104 may receive the NFTs from the distributed evaluation platform 102 via the communication interface 115 and while the first wireless data connection is established. In some examples, the client device 104 may receive only NFTs overwritten with remedial tokens in step 227. In other instances, the client device 104 may additionally receive the remaining NFTs generated at step 206 that were not overwritten by remedial tokens. In some instances, based on or in response to receive the NFTs, the client device 104 may store the NFTs in the client device 104. For example, the NFTs may be stored in internal memory of the client device 104, and/or external memory.

At step 231, distributed evaluation platform 102 may establish a connection with event processing system 108. For example, distributed evaluation platform 102 may establish a third wireless data connection with the event processing system 108 to link the event processing system 108 with the distributed evaluation platform 102 (e.g., in preparation for sending event processing requests). In some instances, the distributed evaluation platform 102 may identify whether or not a connection is already established with the event processing system 108. If a connection is already established with the event processing system 108, distributed evaluation platform 102 might not re-establish the connection. If a connection is not yet established with the event processing system 108, the distributed evaluation platform 102 may establish the third wireless data connection as described above.

At step 232, the distributed evaluation platform 102 may send an event processing request to event processing system 108. For example, the distributed evaluation platform 102 may send the event processing request via the communication interface 115 and while the third wireless data connection is established. In some examples, the distributed evaluation platform 102 may send the event processing request received at step 204 to event processing system 108. For example, the distributed evaluation platform 102 may send transaction requests, fund transfer requests, withdrawal requests, payment processing requests, and/or other requests (which may, e.g., involve one or more of the NFTs sent to the client device at step 204). In some instances, the distributed evaluation platform 102 may additionally send one or more commands directing the event processing system 108 to process an event. For example, the distributed evaluation platform 102 may send one or more commands directing the event processing system to perform a transaction between two accounts (e.g., bank accounts managed by a financial institution).

At step 233, the event processing system 108 may receive the event processing request from the distributed evaluation platform 102. For example, the event processing system 108 may receive the event processing request from the distributed evaluation platform 102 via the communication interface 115 and while the third wireless data connection is established. In some examples, the event processing system 108 may additionally receive the one or more commands directing the event processing system 108 to process the event.

At step 234, the event processing system 108 may process the event processing request. In some examples, the event processing system 108 may process the event processing request based on or in response to the one or more commands directing the event processing system 108 to process the event received at step 233. For example, the event processing system 108 may cause a transaction to be completed between two accounts (e.g., bank accounts managed by a financial institution).

Referring to FIG. 2H, at step 235 the distributed evaluation platform 102 may refine the machine learning model based on the remediation actions and user implementation input. In some instances, refining the machine learning model may include analyzing one or more of: the user input confirming implementation of a suggested remediation action, user input rejecting implementation of a suggested remediation action, user input bypassing automatic implementation of a remediation action, and/or other information. Additionally or alternatively, refining the machine learning model may include inputting the user implementation input and the remediation actions contained in the remedial tokens into the machine learning model. By inputting the user implementation input and the remediation actions into the machine learning model, the distributed evaluation platform 102 may create an iterative feedback loop that may continuously and dynamically refine the machine learning model to improve its accuracy. For example, distributed evaluation platform 102 may identify that the user confirmed implementation of a particular remediation action for multiple NFTs. In these instances, the distributed evaluation platform 102 may refine the machine learning model to automatically implement that remediation action without asking for user implementation input in future iterations of the feedback loop. In doing so, the distributed evaluation platform 102 may improve accuracy and effectiveness of the remediation action generation process by the machine learning model, which may, e.g., result in more efficient training of models trained by the distributed evaluation platform 102 (and may in some instances, conserve computing and/or processing power/resources in doing so).

Figure 4A:
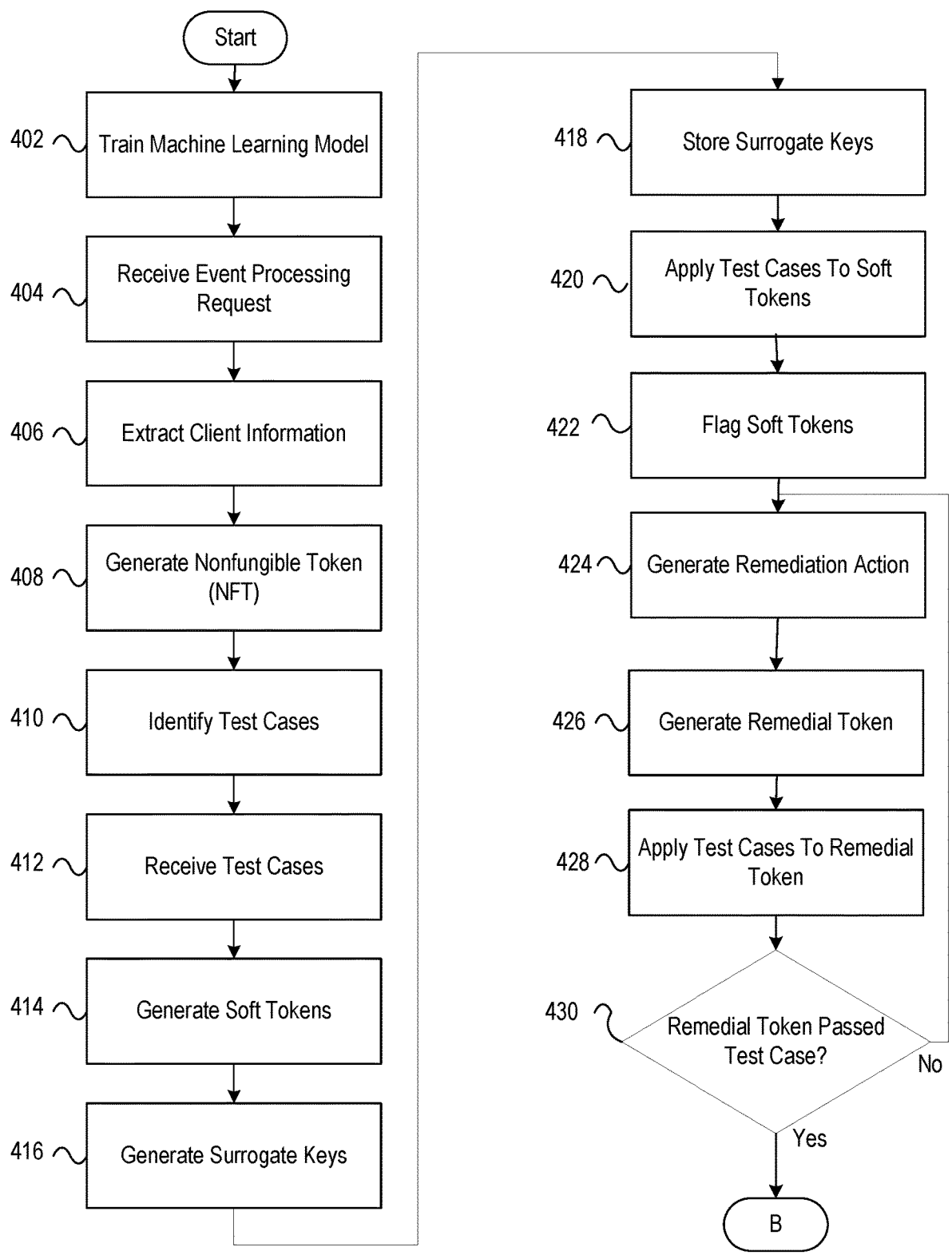
FIGS. 4A-4B depict illustrative methods for evaluating NFTs through virtual token cloning and using a machine learning model in accordance with one or more example embodiments.
Figure 4B:
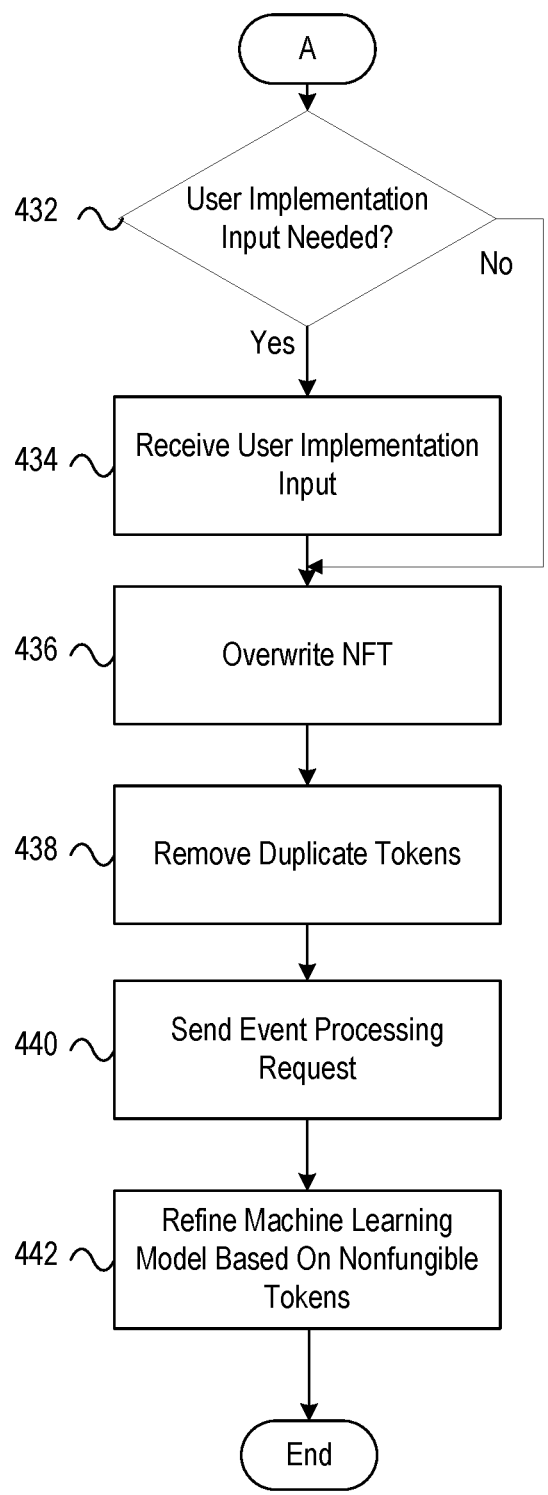

FIGS. 4A and 4B depict an illustrative method for evaluating NFTs through virtual token cloning and using a machine learning model in accordance with one or more example embodiments. Referring to FIG. 4A, at step 402, a computing platform having at least one processor, a communication interface, and memory may train a machine learning model. At step 404, the computing platform may receive an event processing request. At step 406, the computing platform may extract client information from the event processing request. At step 408, the computing platform may generate NFTs based on the client information. At step 410, the computing platform may identify test cases for the NFTs. At step 412, the computing platform may receive the test cases identified at step 410. At step 414, the computing platform may generate soft tokens based on the test cases. At step 416, the computing platform may generate surrogate keys corresponding to the soft tokens. At step 418, the computing platform may store the surrogate keys. At step 420, the computing platform may apply the test cases to their corresponding soft tokens. At step 422, the computing platform may flag the soft tokens based on applying the test cases. At step 424, the computing platform may generate remediation actions using the machine learning model and based on applying the test cases. At step 426, the computing platform may generate remedial tokens based on the remediation actions and the soft tokens. At step 428, the computing platform may apply the test cases to the remedial tokens. At step 430, the computing platform may identify whether each remedial token passed the test case applied at step 428. Based on identifying that a remedial token has not passed the test case, the method may send the remedial token back to step 424 to generate new remediation actions. Based on identifying that a remedial token has passed the test case, the method may progress to step 432 in FIG. 4B.

Referring to FIG. 4B, at step 432, the computing platform may determine whether user implementation input is needed. Based on a determination that user implementation input is needed, the method may progress to step 434. Based on a determination that user implementation input is not needed, the method may progress to step 436. At step 434, the computing platform may receive user implementation input. At step 436, the computing platform may overwrite the NFTs with the remedial tokens based on user implementation input and/or automatically overwrite the NFTs with the remedial tokens. At step 438, the computing platform may remove duplicate NFTs. At step 440, the computing platform may send an event processing request to an event processing system. At step 442, the computing platform may refine the machine learning model based on the overwritten NFTs.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train, based on historical nonfungible tokens (NFTs) and test cases for the historical NFTs, a machine learning model, wherein training the machine learning model configures the machine learning model to output remediation actions to address identified errors in execution of the test cases on a given NFT;
receive an event processing request comprising client information;
generate, based on the client information, an NFT corresponding to the client information;
establish a connection with a first user device;
receive, from the first user device, one or more test cases for servicing event processing requests with the client information corresponding to the NFT;
generate, based on the one or more test cases and using a distributed evaluation function, a plurality of soft tokens corresponding to the NFT, wherein each soft token comprises a virtual clone token comprising a copy of a subset of the client information corresponding to the NFT, and wherein a unique soft token is generated for each of the one or more test cases;

identify that at least one soft token of the plurality of soft tokens failed a corresponding test case;

input, into the machine learning model and based on identifying that the at least one soft token failed the corresponding test case, information of the test case failure, to produce a remediation action configured to validate the client information for servicing the event processing request;

generate, using the machine learning model and based on the at least one soft token and the remediation action, a remedial token, wherein the remedial token comprises a copy of the at least one soft token updated based on the remediation action;

identify whether the remedial token passed the corresponding test case;

establish a connection with a second user device;

cause, at the second user device, display of a token validation interface and an indication of whether the remedial token passed the corresponding test case;

receive, from the second user device and based on causing the display of the token validation interface, an implementation input, and in response:

overwrite, based on identifying that the remedial token passed the corresponding test case and based on the implementation input, the NFT with the remedial token; or override, based on the implementation input, implementation of the remediation action;

send, to an event processing system, the event processing request and the remedial token; and refine, based on the remediation action, the machine learning model, wherein the refining configures the machine learning model to automatically implement the remediation action if the machine learning model identifies that a soft token fails the corresponding test case.

2. The computing platform of claim 1, wherein the memory stores additional computer-readable instructions that, when executed by the at least one processor, cause the computing platform to:

flag, based on identifying that at least one of the plurality of soft tokens passed the corresponding test case, the at least one soft token with a pass flag; and send the at least one soft token with a pass flag to a client device.

3. The computing platform of claim 1, wherein the memory stores additional computer-readable instructions that, when executed by the at least one processor, cause the computing platform:

send the remedial token to a client device; and send one or more commands directing the client device to display information of the remedial token, and wherein sending the one or more commands directing the client device to display information of the remedial token causes the client device to display the information of the remedial token.

4. The computing platform of claim 3, wherein the memory stores additional computer-readable instructions that, when executed by the at least one processor, cause the computing platform to:

receive, from the client device, user implementation input, wherein the user implementation input comprises one or more commands directing the computing platform to overwrite the NFT based on the user implementation input; and refine, based on the user implementation input, the machine learning model.

5. The computing platform of claim 3, wherein the memory stores additional computer-readable instructions that, when executed by the at least one processor, cause the computing platform to:

overwrite the NFT automatically based on the historical NFTs and using the remedial token.

6. The computing platform of claim 1, wherein the one or more test cases comprise one or more of: user information validation, account information validation, payment processing parameters, transaction validation requirements, regional event processing rules, host system rules, or administrator rules.

7. The computing platform of claim 1, wherein the memory stores additional computer-readable instructions that, when executed by the at least one processor, cause the computing platform to:

generate, based on the plurality of soft tokens, surrogate keys, wherein the surrogate keys comprise sequentially generated values linking the plurality of soft tokens to the NFT;

link the surrogate keys to the remedial tokens; and store the surrogate keys.

8. The computing platform of claim 7, wherein overwriting the NFT comprises:

deleting, based on the surrogate keys, the NFT corresponding to one or more specific values; and replacing, based on the surrogate keys, the deleted NFT with a new NFT using the remedial tokens corresponding to the one or more specific values.

9. The computing platform of claim 1, wherein the NFT comprises one or more of: user profile information, account information, event processing requests, or biometric information.

10. The computing platform of claim 1, the memory stores additional computer-readable instructions that, when executed by the at least one processor, cause the computing platform to:

generate, based on a second soft token different from the at least one soft token and a second remediation action different from the remediation action, a second remedial token, wherein the second remedial token comprises a copy of the second soft token, updated based on the second remediation action;

identify that the second remedial token failed the corresponding test case; and input information of the test case failure into the machine learning model to produce a corresponding new remediation action.

11. The computing platform of claim 1, wherein the memory stores additional computer-readable instructions that, when executed by the at least one processor, cause the computing platform to:

identify, using the machine learning model and based on the historical nonfungible tokens, whether the remediation action has historically been implemented; and determine, based on identifying whether the remediation action has historically been implemented, whether or not to request user acceptance of the remediation action.

12. The computing platform of claim 1, wherein the computing platform is further configured to:
   identify, based on the remediation action, whether or not the client information comprises potentially unauthorized information; and
   send, based on identifying that the client information comprises the potentially unauthorized information, a potential unauthorized activity alert to a client device.

13. The computing platform of claim 1, wherein the remedial tokens further comprise one or more of: user preferences, market information, market scenarios, user suggestions, or administrator preferences.

14. The computing platform of claim 1, wherein the remediation actions comprise one or more of: modifying information, replacing information, or providing new information.

15. The computing platform of claim 1, wherein the client information comprises one or more of: payment files, transaction files, regional validation laws, administrator validation laws, or bulk files.

16. The computing platform of claim 1, wherein the historical nonfungible tokens correspond to a second client device different from a client device corresponding to the NFT.

17. The computing platform of claim 1, wherein the memory stores additional computer-readable instructions that, when executed by the at least one processor, cause the computing platform to:
   identify, based on a comparison of the NFT to one or more historical NFTs, whether the NFT is a duplicate of any of the one or more historical NFTs; and
   delete, based on identifying that the NFT is a duplicate of any of the one or more historical NFTs, the NFT.

18. The computing platform of claim 1, wherein the remediation action comprises adding, to the client information corresponding to the NFT, an identifier, wherein the identifier is associated with the event processing request and is required to service the event processing request.

19. A method comprising:
   at a computing platform comprising at least one processor, a communication interface, and memory:
      training, based on historical nonfungible tokens (NFTs) and test cases for the historical NFTs, a machine learning model, wherein training the machine learning model configures the machine learning model to output remediation actions to address identified errors in execution of the test cases on a given NFT;
      receiving an event processing request comprising client information;
      generating, based on the client information, an NFT corresponding to the client information;
      establishing a connection with a first user device;
      receiving, from the first user device, one or more test cases for servicing event processing requests with the client information corresponding to the NFT;
      generating, based on the one or more test cases and using a distributed evaluation platform, a plurality of soft tokens corresponding to the NFT, wherein each soft token comprises a virtual clone token comprising a copy of a subset of the client information corresponding to the NFT, and wherein a unique soft token is generated for each of the one or more test cases;
      identifying that at least one soft token of the plurality of soft tokens failed a corresponding test case;
      inputting, into the machine learning model and based on identifying that the at least one soft token failed the corresponding test case, information of the test case failure, to produce a remediation action configured to validate the client information for servicing the event processing request;
      generating, using the machine learning model and based on the at least one soft token and the remediation action, a remedial token, wherein the remedial token comprises a copy of the at least one soft token updated based on the remediation action;
      identifying whether the remedial token passed the corresponding test case;
      establishing a connection with a second user device;
      causing, at the second user device, display of a token validation interface and an indication of whether the remedial token passed the corresponding test case;
      receiving, from the second user device and based on causing the display of the token validation interface, an implementation input, and in response:
         overwriting, based on identifying that the remedial token passed the corresponding test case, the NFT with the remedial token; or
         overriding, based on the implementation input, implementation of the remediation action
      sending, to an event processing system, the event processing request and the remedial token; and
      refining, based on the remediation action, the machine learning model, wherein the refining configures the machine learning model to automatically implement the remediation action if the machine learning model identifies that a soft token fails the corresponding test case.

20. One or more non-transitory computer-readable media storing instructions that, when executed by a computing platform comprising at least one processor, a communication interface, and memory, cause the computing platform to:
   train, based on historical nonfungible tokens (NFTs) and test cases for the historical NFTs, a machine learning model, wherein training the machine learning model configures the machine learning model to output remediation actions to address identified errors in execution of the test cases on a given NFT;
   receive an event processing request comprising client information;
   generate, based on the client information, an NFT corresponding to the client information;
   establish a connection with a first user device;
   receive, from the first user device, one or more test cases for servicing event processing requests with the client information corresponding to the NFT;
   generate, based on the one or more test cases and using a distributed evaluation function, a plurality of soft tokens corresponding to the NFT, wherein each soft token comprises a virtual clone token comprising a copy of a subset of the client information corresponding to the NFT, and wherein a unique soft token is generated for each of the one or more test cases;
   identify that at least one soft token of the plurality of soft tokens failed a corresponding test case;
   input, into the machine learning model and based on identifying that the at least one soft token failed the corresponding test case, information of the test case failure, to produce a remediation action configured to validate the client information for servicing the event processing request;
   generate, using the machine learning model and based on the at least one soft token and the remediation action, a remedial token, wherein the remedial token comprises a copy of the at least one soft token updated based on the remediation action;
identify whether the remedial token passed the corresponding test case;
establish a connection with a second user device;
cause, at the second user device, display of a token validation interface and an indication of whether the remedial token passed the corresponding test case;
receive, from the second user device and based on causing the display of the token validation interface, an implementation input, and in response:
  overwrite, based on identifying that the remedial token passed the corresponding test case, the NFT with the remedial token; or
  override, based on the implementation input, implementation of the remediation action;
send, to an event processing system, the event processing request and the remedial token; and
refine, based on the remediation action, the machine learning model, wherein the refining configures the machine learning model to automatically implement the remediation action if the machine learning model identifies that a soft token fails the corresponding test case.

* * * * *